United States Patent [19]

Zastrow

[11] Patent Number: 5,748,670
[45] Date of Patent: May 5, 1998

[54] METHOD OF DEMODULATING CHIRP SPREAD SPECTRUM

[75] Inventor: Lyn R. Zastrow, Coppell, Tex.

[73] Assignee: Zilog, Inc., Campbell, Calif.

[21] Appl. No.: 450,974

[22] Filed: May 25, 1995

[51] Int. Cl.⁶ .............. H04B 15/00; H04K 1/00; H04L 27/30
[52] U.S. Cl. .......... 375/204; 342/132; 324/76.12
[58] Field of Search .............. 375/200, 204, 375/206; 342/132; 324/76.12, 76.19, 76.26, 76.39

[56] References Cited

U.S. PATENT DOCUMENTS

| | | | |
|---|---|---|---|
| 4,424,482 | 1/1984 | Drogin | 324/79 |
| 4,438,519 | 3/1984 | Bose | 375/200 |
| 4,470,025 | 9/1984 | Baker | 331/178 |
| 4,480,232 | 10/1984 | Baker et al. | 331/1 A |
| 4,560,961 | 12/1985 | Kestenbaum | 332/23 |
| 4,680,540 | 7/1987 | Niki et al. | 324/78 R |
| 4,707,653 | 11/1987 | Wagner | 324/78 R |
| 4,849,688 | 7/1989 | Chuba et al. | 324/78 R |
| 5,019,825 | 5/1991 | McCorkle | 342/301 |
| 5,056,108 | 10/1991 | Lund | 375/200 |

Primary Examiner—Stephen Chin
Assistant Examiner—Bryan Webster
Attorney, Agent, or Firm—Majestic, Parsons, Siebert & Hsue

[57] ABSTRACT

A digital circuit is used to demodulate a linear chirp spread spectrum signal. The digital circuit uses a counter which is clocked so as to count during the time period between the pulses of a chirp signal. The circuitry also uses a digital filter to determine whether the frequencies of the linear chirp signal are within the correct bandwidth. The output of the counter is compared with the previous count to produce a difference count. A processor uses this difference count value to determine the characteristics of a chirp signal being decoded. A difference signal test circuit provides a digital filter for the difference count to eliminate spurious noise conditions.

12 Claims, 8 Drawing Sheets $t_1 = t_0 + \Delta T$
$t_2 = t_1 + \Delta T + \Delta K_t$
$t_3 = t_2 + \Delta T + 2\Delta K_t$
$t_4 = t_3 + \Delta T + 3\Delta K_t$

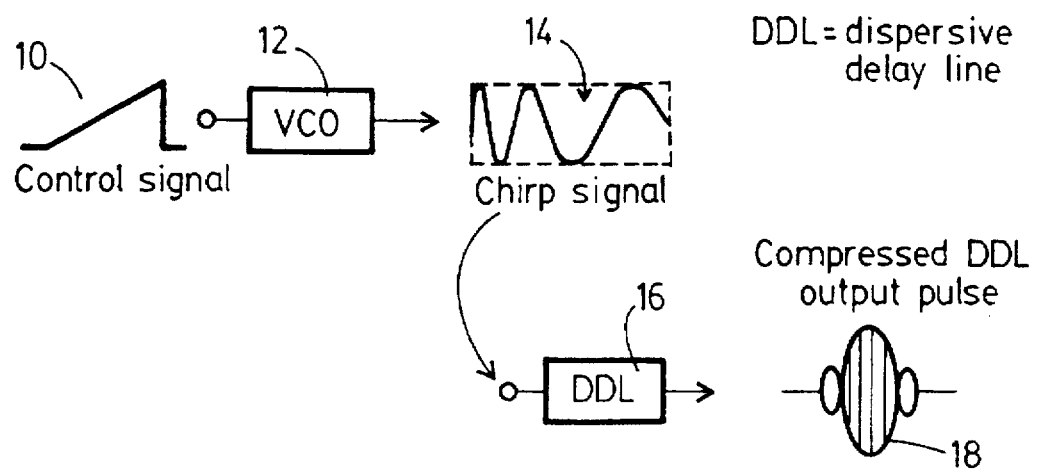
FIG._1A.
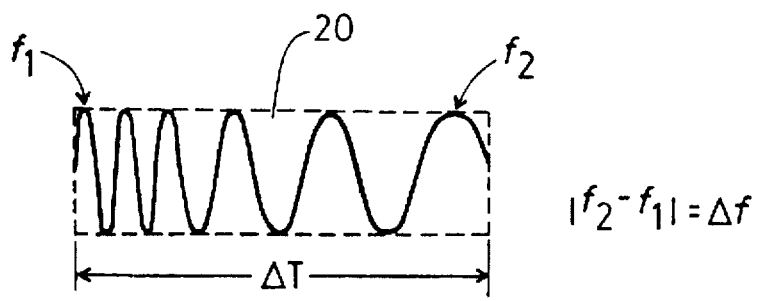
$|f_2 - f_1| = \Delta f$
FIG._1B.
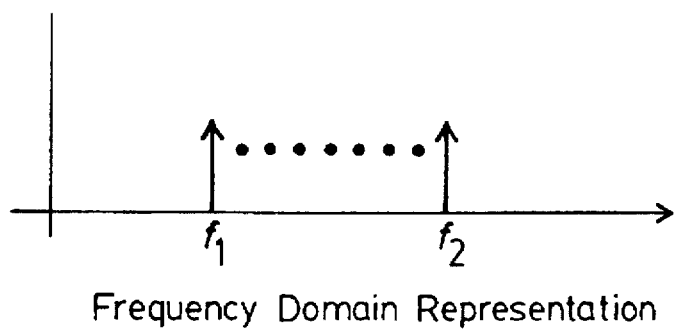
Frequency Domain Representation
FIG._1C.

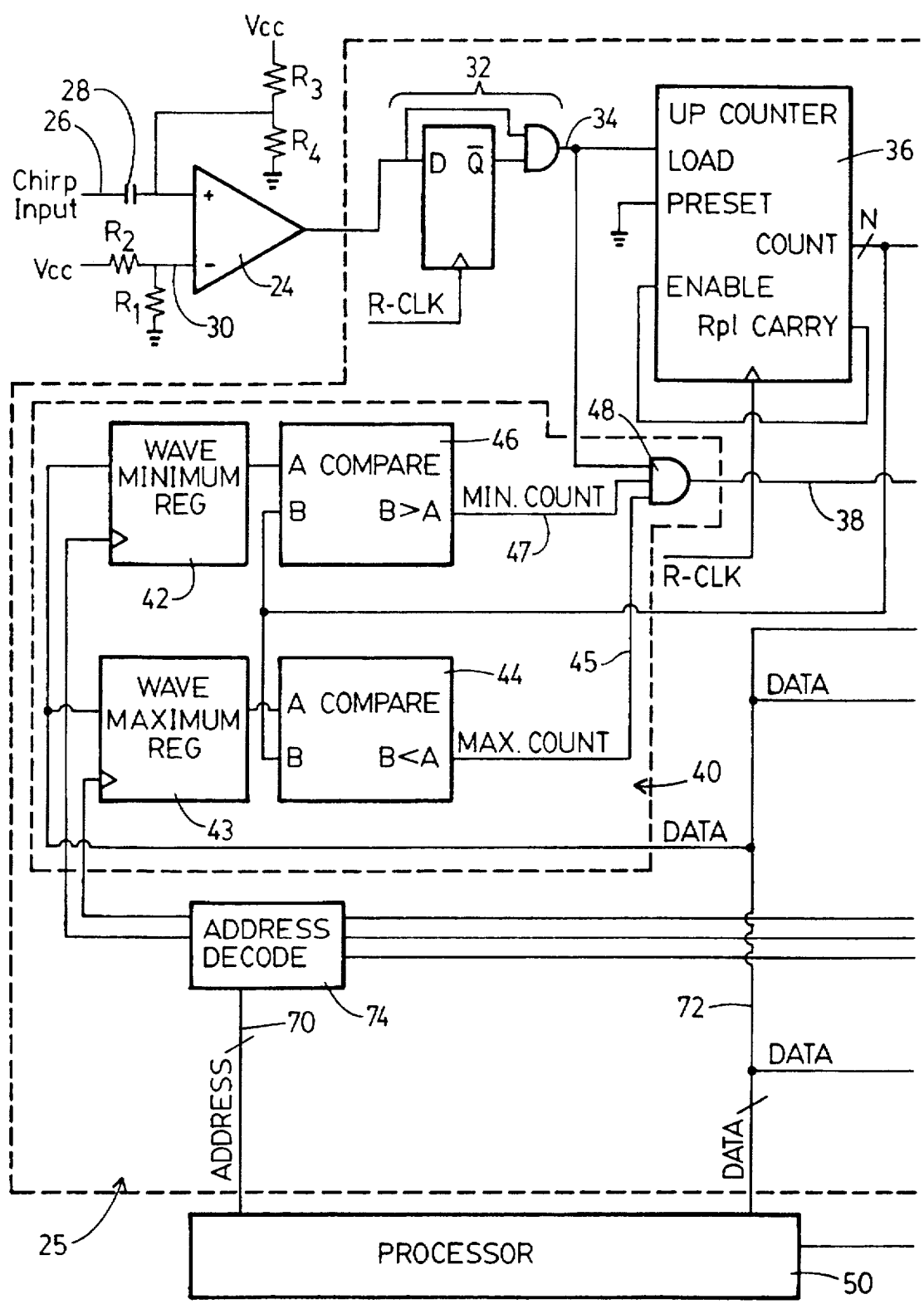
FIG._2A.

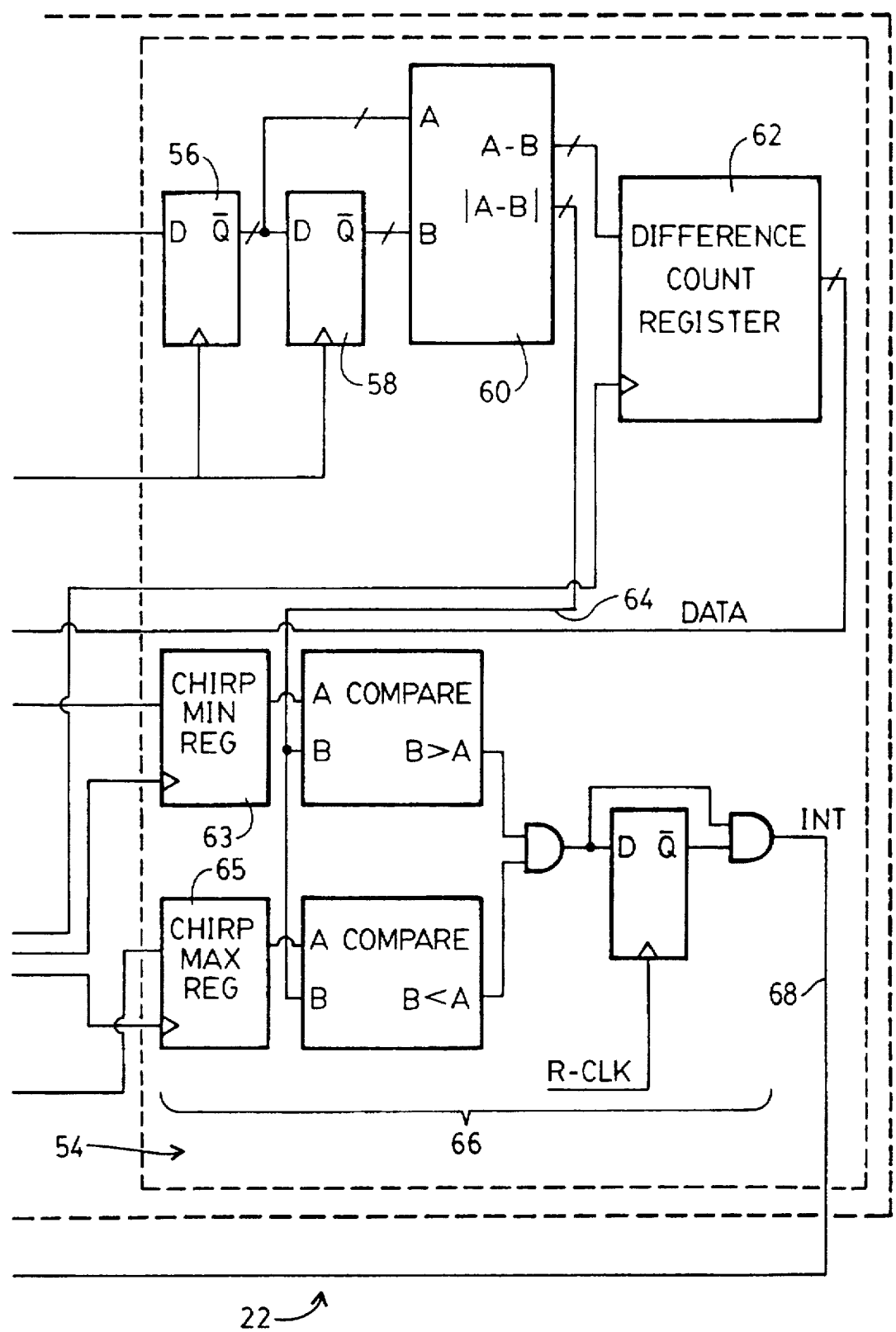
FIG._2B.

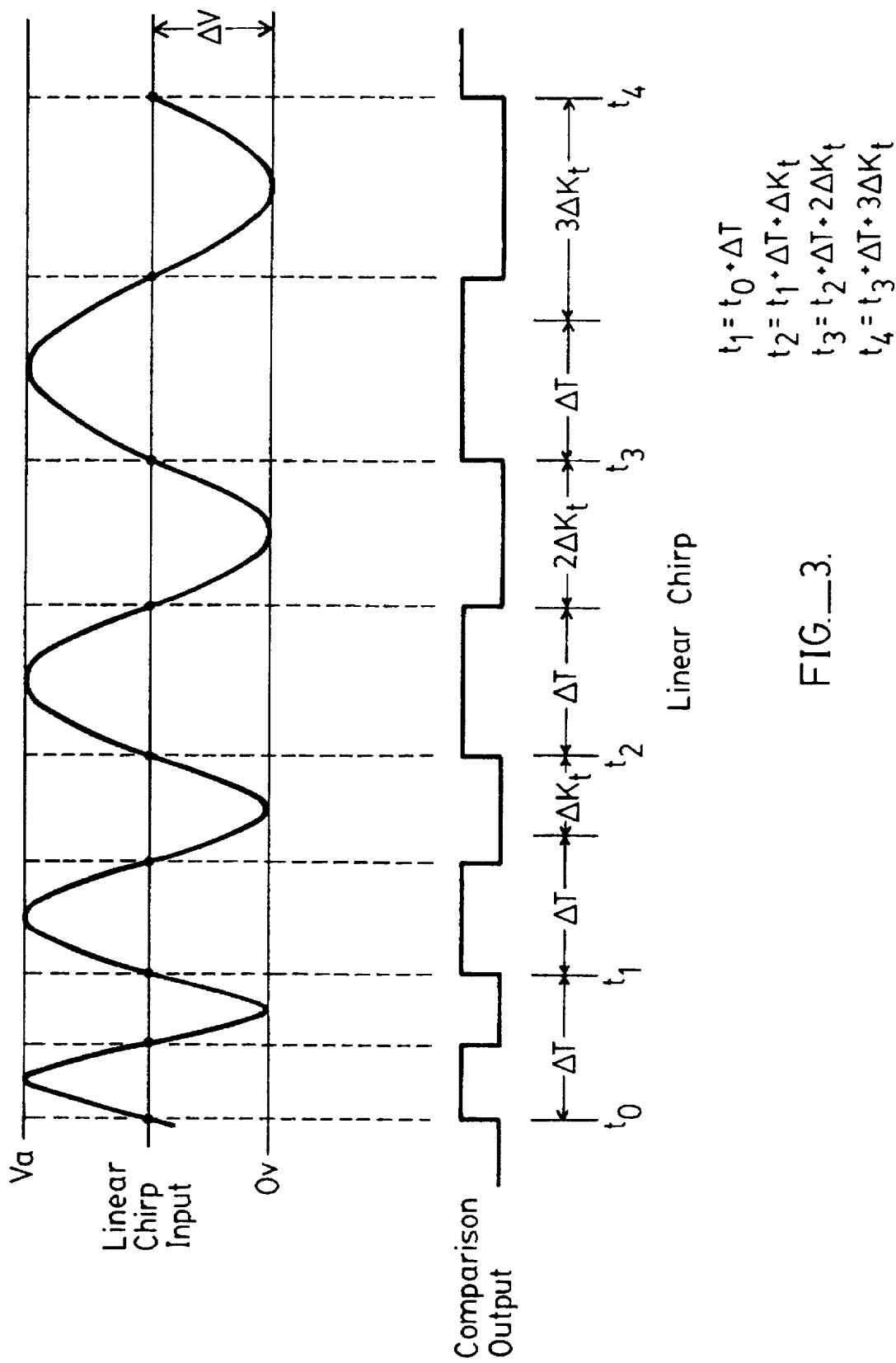
FIG._3.

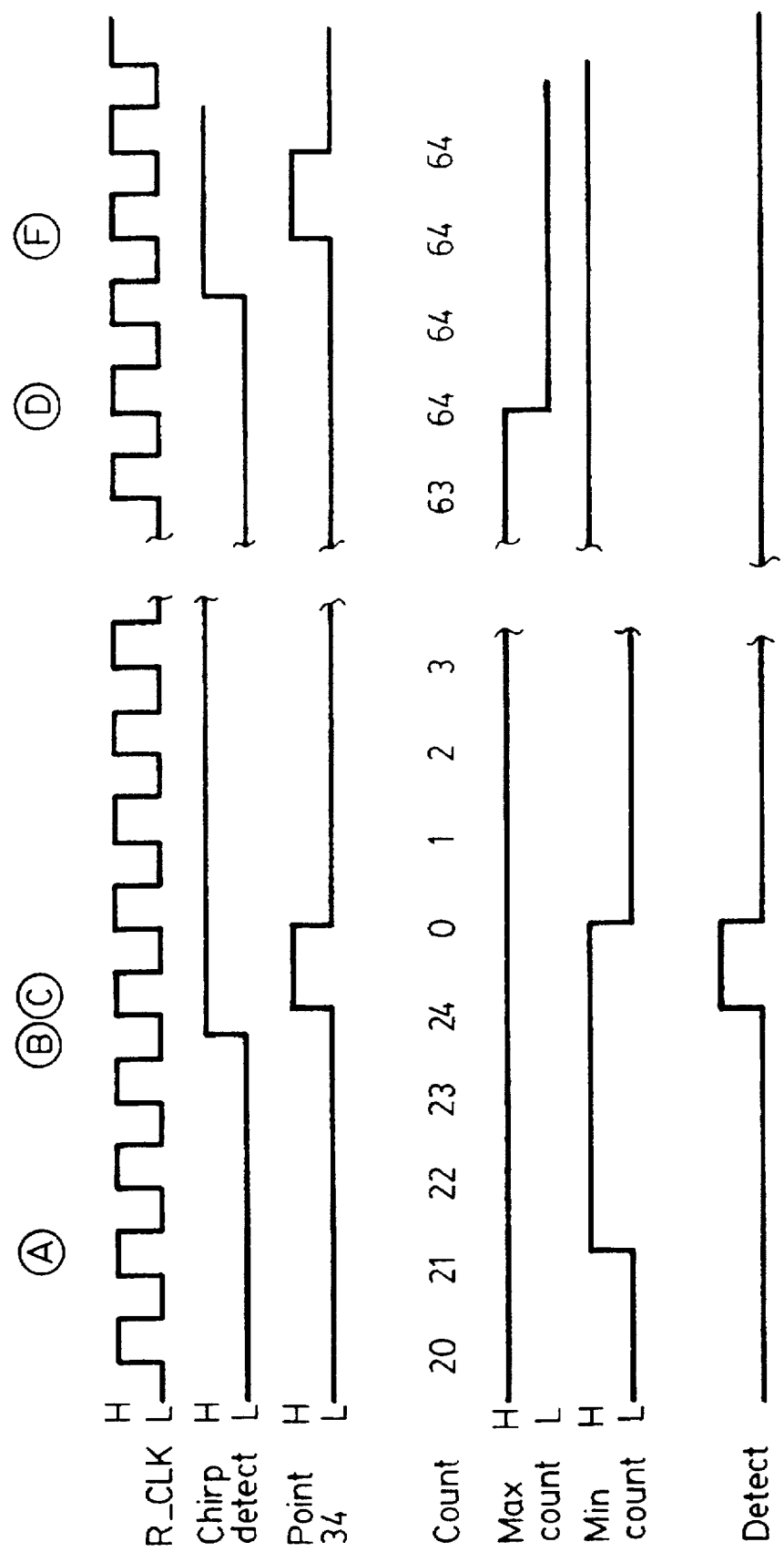
FIG._4.

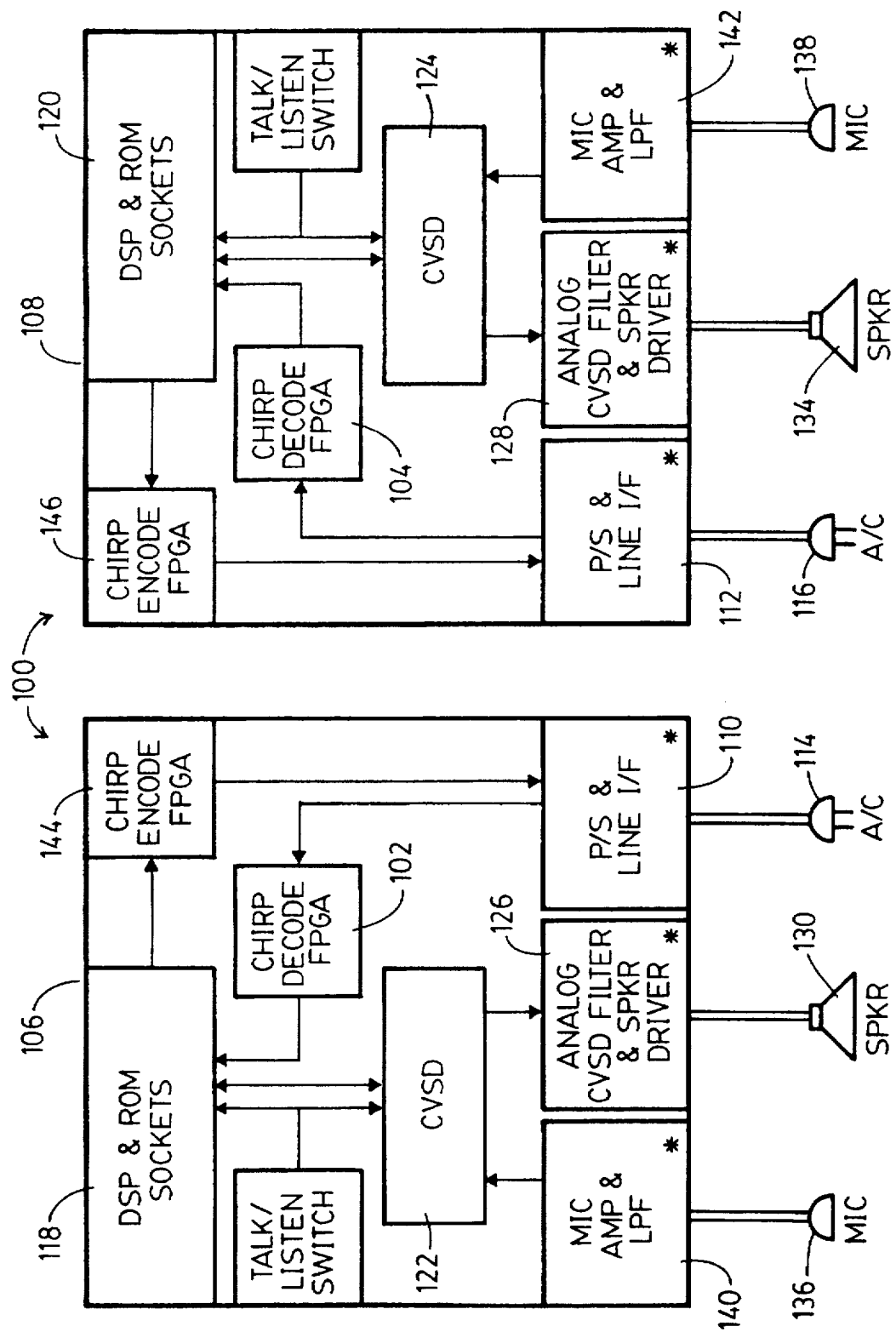
FIG._5.

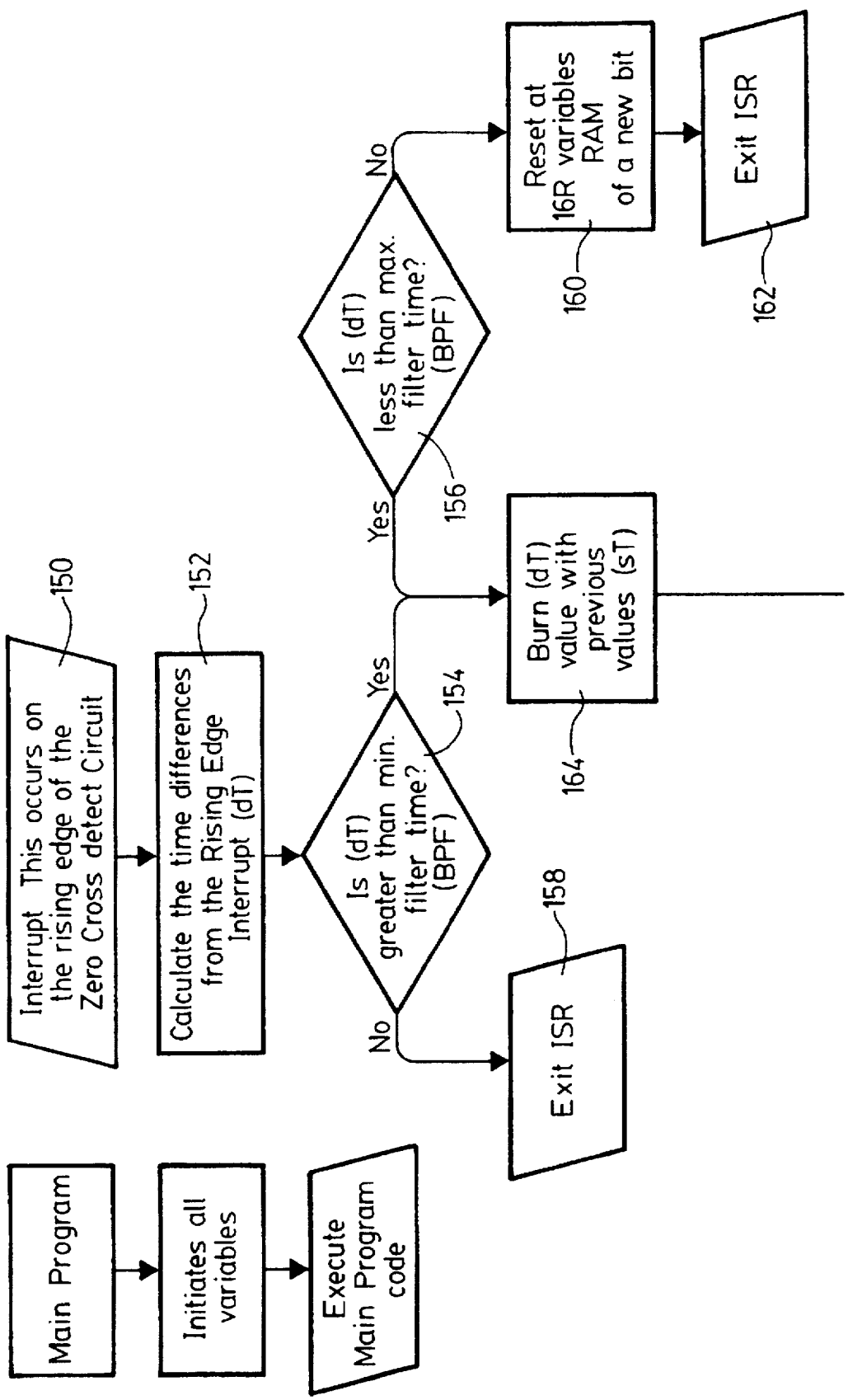
FIG._6A.

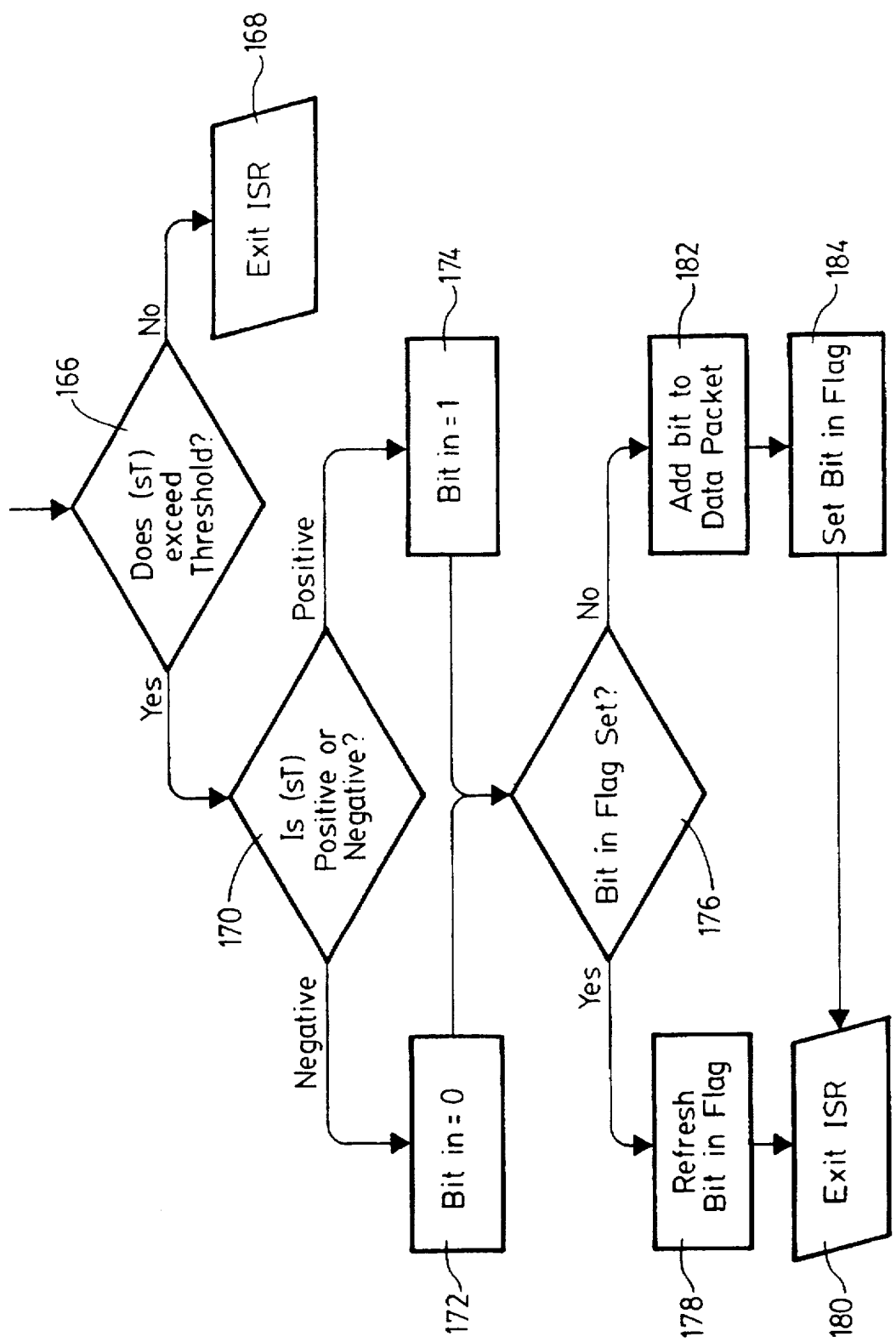
FIG._6B.

1

METHOD OF DEMODULATING CHIRP SPREAD SPECTRUM

BACKGROUND OF THE INVENTION

The present invention relates to receivers for demodulating chirp spread spectrum data. The bandwidth used in spread spectrum systems is much greater than the spectral bandwidth required for the rate of information sent. Spread spectrum systems use this increased bandwidth so that the system can tolerate a greater amount of noise. The basis for spread spectrum technology is expressed by C. E. Shannon in the form of channel capacity:

$$C = W \log_2 \left( 1 + \frac{S}{N} \right)$$

where

C=capacity in bits per second,
W=bandwidth in Hertz,
N=noise power, and
S=signal power.

As can be seen from this equation, by increasing the bandwidth, a greater level of noise power can be tolerated.

Spread spectrum communications involve expanding the bandwidth of a signal, transmitting that expanded spread spectrum signal, and recovering the desired signal by remapping the received spread spectrum signal onto the original information bandwidth. The purpose of this series of bandwidth trades is to allow the system to deliver information with fewer bit errors in a noisy signal environment.

One type of spread spectrum system uses linear chirp modulation. Chirp transmissions are characterized by pulsed signals whose frequency varies in some known way during each pulse period. The receiver for the chirp signals is typically an analog filter. The analog filter is matched to the angular rate of change of the transmitted frequency-swept signal.

FIG. 1A is a diagram that shows a prior art chirp spread spectrum system. A control signal 10 is sent to a voltage control oscillator (VCO) 12. The VCO produces the chirp spread spectrum signal 14. The chirp spectrum signal is demodulated by the analog filter 16. In this case, a dispersive delay line is used. The received signal is stored by the dispersive delay line until the entire ensemble of frequencies in one sweep arrives, and the sum power of all the frequencies is output at one time. In this way, the pulses of the signal add together over a much shorter period of time than the chirp signal and reinforce each other to produce a much stronger signal 18.

FIG. 1B is a graph of the chirp signal 20. This graph shows one sweep of the chirp signal having a time period $\Delta T$. The frequency at the beginning is $f_1$, and the frequency at the end is $f_2$, so that $\Delta f = |f_2 - f_1|$. FIG. 1C is a frequency domain graph of the chirp signal of FIG. 1B.

A problem with prior art receivers for chirp spread spectrum data is that they use analog filters, such as a dispersive delay line. Analog filters can require individual adjustment. In addition, analog filters' performance can degrade over time and their characteristics change with temperature. These undesired analog effects will decrease the over-all receiver sensitivity and increase the number of bit-errors. It is desired to have a receiver for chirp spread spectrum data without these problems.

SUMMARY OF THE INVENTION

The present invention is a digital system for demodulating chirp spread spectrum data. Digital systems have the advantage that they can be cheaply manufactured, do not get detuned over time, and do not have to be individually adjusted. In addition, a digital system offers the capacity to cost-effectively decode non-linear sweeping functions (i.e., logarithmic and parabolic) as these digital filters are more cost-effective to implement.

The present invention uses a counter to count the time period between the zero-crossings in the chirp signal. The counter is preferably supplied with a clock signal of a known frequency to aid in determining the time period between the zero-crossings in the chirp signal. A comparitor preferably supplies to the counter a digital signal that is an indication of a pulse in the chirp signal. The comparitor can produce this digital signal by comparing the chirp signal to a fixed voltage.

In addition, a digital filter is preferably used to determine whether the frequencies of the chirp pulses are within the predetermined frequency range. This digital filter can be implemented with registers and comparitors connected to the counter for high-frequency systems, or in a comparable software algorithm for lower-frequency systems. The determination of hardware versus software will change over time as processors get faster and less expensive.

By subtracting two count signals from each other, an indication of the change in the time period between two sets of pulses can be produced. A microprocessor or digital signal processor can be used to determine from this subtracted count whether a chirp signal is being sent. In addition, validating logic can see whether the indication of the subtracted count value is within the acceptable range for a chirp signal.

BRIEF DESCRIPTION OF THE DRAWINGS

FIG. 1A is a diagram of a prior art chirp spread spectrum modulator and demodulator. FIG. 1B is a graph of a chirp signal. FIG. 1C is a frequency domain graph of the chirp signal of FIG. 1B.

FIG. 2 is a diagram of the receiver for the chirp system spread spectrum demodulator.

FIG. 3 is a graph of the linear chirp signal and the comparitor output.

FIG. 4 is a timing diagram of the receiver unit of FIG. 2.

FIG. 5 is a diagram of an intercom system using the receiver unit of FIG. 2.

FIG. 6 is flowchart of an alternate embodiment of the present invention.

DETAILED DESCRIPTION OF THE DRAWINGS

FIG. 2 is a diagram of the receiver 22 for a demodulating chirp spread spectrum system. This system uses a comparitor 24 to produce a digital signal in response to the input chirp spread spectrum signal. Capacitor 28 removes any DC bias of the input chirp signal received along analog input line 26. The resistors $R_3$ and $R_4$ are used to provide a DC bias to the analog input of comparitor 24 such that the average voltage of the positive analog input is at the midpoint of the operating voltage of the comparitor. For example, if the comparitor 24 was operating from a voltage of 0 to 5 volts, then values of $R_3$ and $R_4$ would be chosen so that the average voltage at the positive input of the comparitor would be 2.5 volts. The comparitor 24 compares this input signal with a fixed voltage input at point 30. This fixed $\Delta V$ value is set by a voltage divider so that the fixed value $\Delta V$ at point 30 is determined by the equation $\Delta V = V_{cc} R_1/(R_1 + R_2)$. Ideally, $R_1 = R_2$ so that $\Delta V = \frac{1}{2} V_{cc}$. Looking at FIG. 3, the time separation of the pulses in the chirp signal are separated by times $t_0$, $t_1$, $t_2$ and $t_3$. In a linear chirp system, these times are related by the equation $t_n=t_{n-1}+\Delta k_t$. The $\Delta k_t$ value is related to the rate of change of the frequency in the linear chirp input. For a linear system, the value of $\Delta k_t$ is nearly constant. It will only vary by the digital quantization noise. For non-linear chirp systems, the value of $\Delta k_t$ will follow an arithmetic functional argument. Circuitry 32 produces a clocked pulse on the rising edge of the output of the comparitor 24.

Looking at FIG. 4, the chirp detect occurs at time C. The difference in time B to time C is referred to digital quantization noise. At this time, a pulse is created at point 34 by the circuitry 32. This pulse on line 34 will cause the counter 36 to be loaded with the preset value (all zeros) and begin counting at the next clock pulse. The counter 36 is used to count between the pulses of the chirp signal. For this reason, the clock value (R_CLK) must have a much higher frequency than the frequencies range of the input chirp signal. In a preferred embodiment, the bandwidth of the chirp signal is from 150 to 450 kHz. This low-frequency range is used in power line communications. Power line communications use low-frequency signals placed on a power line along with the AC power signal. Spread spectrum techniques are used to send the signals on the power line because power line signals tend to be very noisy as a result of the motors used in household appliances. The clock signal preferably has a frequency of 9.588 MHz.

The counter used in the receiver of Lund U.S. Pat. No. 5,056,108 is arranged in a different manner and used for a different purpose than the counter used in FIG. 2. The counter used in the receiver of the Lund patent is used to control a voltage control oscillator such that the VCO's frequency slowly sweeps in small steps within a certain range. When a pulse is detected at line 34, the counter 36 will count until another pulse is detected at line 34 or the counter reaches a terminal count.

Looking again at FIG. 2, the digital filter 40 is used to ensure that the chirp input is within desired frequency range. Since the bandwidth of the input chirp signal should be within the 150–450 kHz range, and the clock frequency is 9.588 MHz, the minimum frequency corresponds to about 9.588 MHz/450 kHz counts~21 counts, and the maximum frequency corresponds to about 9.588 MHz/150 kHz counts~64 counts. These calculated values can be broadened to take digital quantization noise effects into consideration.

The pulse at point 34 will cause a detect signal to be created on line 38 if the input chirp signal is within the frequency range. The minimum and maximum counts are loaded into the wave minimum register 42 and wave maximum register 43 by the processor 50. The counts of the counter 36 are applied to the digital comparitors 44 and 46. The min_count signal on line 47 is high when the count from the counter 36 is greater than the wave minimum value, twenty-one in the preferred embodiment. The max_count value on line 45 is high when the count of the counter 36 is less than the wave maximum value, sixty-four in the preferred embodiment. In a preferred embodiment, the max_count value, the min_count value and the output of circuitry 32 on line 34 are ANDed together in AND logic 48 to produce the detect signal on line 38 which clocks the flip-flops 56 and 58 discussed below. The pulse on line 34 is in effect filtered by the filter circuitry 40 to produce a filtered detect signal on line 38. The comparitor detect signal on line 34 is sent to the counter 36 to cause the counter 36 to load (initialize).

The operation of the filter circuitry 40 can be better understood with respect to FIG. 4. Looking at FIG. 4, at time A when the count value reaches twenty-one, the min_count value goes high. Since the count is less than sixty-four, the max_count remains high. At time C when a pulse is created at point 34, a detect signal is created on line 38. If either the max_count or min_count value were low, then no detect signal would be created. At time D, the max_count value goes low, since the count reaches sixty-four. For this reason, at time F when a pulse is formed on line 34, no detect signal on line 38 is created since the max_count value has already been reached.

Difference signal circuitry 54 receives the detect signal on line 38 and the counts from the counter 34 to produce indications of the difference between count signals. This difference count signal is an indication of the $\Delta k_t$ value discussed above. The difference signal circuitry 54 includes two sets of flip-flops 56 and 58. When a detect signal is received, the values at the input of the series of flip-flops 56 are sent to the input of the next set of flip-flops 58. In that way, the comparitor 60 has a count at input A and a previous count value at input B. These two values are compared, and the difference is stored in the difference count register 62. The value in the difference count register 62 is accessible by the processor 50, and can be used to determine the characteristics of the chirp signal. The absolute value of the difference between counts is sent along line 64 to a difference signal test circuitry 66. This circuitry compares the absolute value on line 64 to a chirp minimum value and a chirp maximum value. The chirp minimum and chirp maximum values are values for the possible range of the $\Delta k_t$ count. These registers are used to store the calculated values of $\Delta k_{tmin}$ and $\Delta k_{tmax}$, respectively. In a linear chirp system, the chirp minimum and chirp maximum values will be nearly equal in value. Their differences will take account of the digital quantization noise effect. This circuitry 66 produces an interrupt signal on line 68 when a valid difference count is in the difference count register 62.

The processor 50, using the address lines 70 and data lines 72, can read and write information from registers in the digital circuitry 25. If the address of one of the registers 42, 43, 63, and 65 are sent to the decode circuitry 74, a signal is sent to the correct register. The registers each have a /READ and /WRITE strobe (not shown) which allows data to be read and written to and from the processor 50 through line 72. For example, the value in the difference count register 62 can be read from the data line 72 when addressed by the processor 50. The interrupt signal on line 68 tells the processor 50 when to retrieve data from the difference register 62. Additionally, the values of registers 42, 43, 63 and 65 are initialized before system operation.

The processor can determine from the data in the difference register 62 the characteristics of the chirp signal being decoded. By analyzing its contents, it can be determined if the chirp signal is being ramped up or down. Also, by looking at consecutive values, it can be determined if the chirp signal being decoded is linear or non-linear. If the signal is non-linear, it can be determined if the chirp signal being received is valid by comparing the newly received value to a calculated value where the previous data in the difference register 62 is used as the functional argument $F(z)=f(z^{-1})$. If a certain number of positive values are retrieved from the difference count register 62 over a certain period of time, the processor can determine that a chirp signal whose frequency ramps upward is being sent. If a certain number of negative values are in the difference count register 62 over a period of time, the processor can determine that chirp signal whose frequency ramps downward is being sent.

The original data signal can be decoded from the chirp signals by a predetermined code. A predetermined code may be that a chirp signal with a upward ramping frequency for a time period corresponds to a "1" bit and a chirp signal with a downward ramping frequency for a time period corresponds to a "0" bit. Alternately, a chirp signal with a upward ramping frequency for a time period could indicate a "1" bit, and the lack of a chirp signal over a time period could indicate a "0" bit. Due to the number of pulses in the chirp signal and the interrelated nature of these pulses, the processor 50 can interpret the values in the difference count register 62 such that spurious indications due to noise are avoided.

As processors become faster and less expensive, it is desirable to implement more of the aforementioned functions with software in a microprocessor. FIG. 6 is a flowchart of an alternate embodiment of the present invention in which steps of the method are implemented in a microprocessor. It is assumed that counters are embedded as peripherals to the microprocessor that will permit the time value between events (dT) to be generated or calculated. If these are not embedded as a peripheral, an external timer can be used. In step 150, the microprocessor is interrupted by the rising edge of a zero-detect circuit. In step 152, the count of the time between rising interrupts is compared with the last count of the time between rising interrupts to produce an indication (dT) of the time difference. In steps 154 and 156, if (dT) is less than the minimum filter time, the program is exited in step 158. If (dT) is greater than the maximum filter time, the variables are reset in step 160 and the program is exited in step 162. If (dT) is between the maximum and the minimum filter time value, the (dT) value is added to a sum value (sT) in step 164. In step 166, if the (sT) value is less than a threshold value the program is exited in step 168. If the (sT) value is greater than a threshold value, this indicates that a bit of data is received. In step 170, if (sT) is negative (decreasing chirp frequency) the input bit is set as "0" (step 172). If (sT) is positive (increasing chirp frequency), the input bit is set as "1" (step 174). In step 176, if the Bit-in-Flag is set, the Bit-in-Flag is refreshed in step 178 and the program is exited in step 180. If the Bit-in-Flag is not set, the input bit value is added to the data packet in step 182; the Bit-in-Flag is set in step 184; and the program is exited in step 180. The Bit-in-Flag is set to zero during initiation in between chirp sections.

FIG. 5 is a diagram showing an intercom system 100 that uses decode circuitry 102 and 104. Decode circuitry 102 and 104 corresponds to circuitry 25 shown in FIG. 2. Looking again at FIG. 5, the intercom system 100 includes multiple intercoms 106 and 108. Each intercom is used to send and receive voice signals over an AC power line. These power line communications are used for short-distance communication in a house without requiring a separate dedicated wire connection between the intercoms. Power circuitry and line communication circuitry 110 and 112 receive the power signal from plugs 114 and 116. The power signal is used to power the modules 106 and 108. The circuitry 110 and 112 also recovers any chirp signal from the power supply and sends the chirp signal to the chirp decode logic 102 and 104. This chirp decode logic 102 works as described above. The processor and ROM 118 and 120 decode the signal from the chirp decode circuitry 102 and 104. This decoded voice signal is then sent to the digital-to-analog and analog-to-digital converter 122 and 124. Circuitry 126 and 128 filters the voice signal and drives the speakers 130 and 134.

Microphones 136 and 138 cause an analog signal to be produced by the circuitry 140 and 142. The converter 122 and 124 converts the analog signal to a digital signal, which is then encoded by encode circuitry 144 and 146 to produce a chirp signal that is then encoded on the AC power line by the circuitry 110 and 112. The encode circuitry 144 and 146 can produce a chirp signal using counters and filters to set the positions of pulses in the chirp signal such that the separation of the pulses in the chirp signal increases or decreases by a fixed $\Delta k_f$ value.

The chirp signal bandwidth of 300 kHz (450 kHz–150 kHz) is used to transmit 30 kHz of signal data allowing for an improved clarity in a received signal. This improved signal clarity is necessary since the AC power line contains a significant amount of noise.

The digital protocol for the intercom system is as follows. The chirp data transmitted on the AC power lines includes a receiver address along with the data which is used to produce the intercom voice signal. The intercom voice signal will be heard only at the intercom corresponding to this address. After the data is transmitted, there is an inter-message delay of at least four bit periods, in which no chirp signal is sent. The total delay is equal to 4 bit periods plus an additional delay value corresponding to the address of the intercom that desires to send data. In this way, the intercom module with the lowest address will have priority to send a message after another intercom has sent a message.

Various details of the implementation and method are merely illustrative of the invention. It will be understood that the various changes of details may be within the scope of the invention, which is to be limited only by the appended claims.

What is claimed is:

1. A circuit for demodulating an input chirp signal, the input chirp signal including pulses, the frequency of the input chirp signal increasing or decreasing over a period of time, the circuit comprising:

digital circuitry including a counter updated by a fixed frequency clock signal, the counter being adapted to produce a count indicative of the time period between pulses of the input chirp signal the digital circuitry including a digital filter includes minimum and maximum test registers loadable with minimum and maximum test values, the digital filter further including minimum test circuitry and maximum test circuitry connected to receive the minimum and maximum test values respectively from the minimum and maximum test registers, the minimum test circuitry adapted to produce a first signal indicating whether the count of the counter is less than the maximum value and the maximum test circuitry adapted to produce a second signal indicating whether the count of the counter is more than the minimum value; and a processor electrically connected to the digital circuitry, said digital processor adapted to determine whether the frequency of the input chirp signal is increasing or decreasing over the period of time.

2. The circuit of claim 1, further comprising a comparitor for comparing the input chirp signal with a fixed voltage level to produce a digital detect signal that toggles when input chirp signal's voltage level crosses the fixed voltage, said digital detect circuitry being supplied to the digital circuitry.

3. The demodulating circuit of claim 2, wherein the digital circuitry includes circuitry to create a short pulse at the upward transition of said digital detect signal.

4. The demodulating circuit of claim 1, wherein the digital filter further comprises logic adapted to receive the first and second signals and adapted to produce a detect signal on the next chirp signal pulse when the count of the counter is between the minimum and maximum values.

5. The demodulating circuit of claim 1, wherein the processor is further adapted to load the minimum and maximum test values into the minimum and maximum test registers.

6. A circuit for demodulating an input chirp signal, the input chirp signal including pulses, the frequency of the input chirp signal increasing or decreasing over a period of time, the circuit comprising:

digital circuitry including a counter updated by a fixed frequency clock signal, the counter being adapted to produce a count indicative of the time period between pulses of the input chirp signal, the digital circuitry further including difference circuitry connected to receive the counts of the counter to produce a difference signal indicative of the of the time period between the chirp pulses, the difference circuitry includes two sets of flip-flops connected in series, the input of the first set of flip-flops connected to receive the count from said counter, the second set of flip-flops being connected to the output of the first set of flip-flops, and the difference circuitry including a comparitor for comparing the outputs of the first and second set of flip-flops; and a processor electrically connected to the digital circuitry, said digital processor adapted to determine whether the frequency of the input chirp signal is increasing or decreasing over the period of time.

7. A circuit for demodulating an input chirp signal, the input chirp signal including pulses, the frequency of the input chirp signal increasing or decreasing over a period of time, the circuit comprising:

digital circuitry including a counter updated by a fixed frequency clock signal, the counter being adapted to produce a count indicative of the time period between pulses of the input chirp signal, the digital circuitry further including difference circuitry connected to receive the counts of the counter to produce a difference signal indicative of the of the time period between the chirp pulses and including difference signal test circuitry connected to receive the difference signal from the difference circuitry, said difference signal test circuitry adapted to produce a signal when the difference signal is within a preset range; and a processor electrically connected to the digital circuitry, said digital processor adapted to determine whether the frequency of the input chirp signal is increasing or decreasing over the period of time.

8. The demodulating circuit of claim 7, wherein the difference signal test circuitry includes chirp minimum and chirp maximum registers that store chirp minimum and chirp maximum values respectively, and includes chirp minimum test circuitry and chirp maximum test circuitry to produce a signal indicating whether the difference signal magnitude is greater than the chirp maximum value and another signal indicating whether the difference signal magnitude is more than the chirp minimum value.

9. A circuit for demodulating an input chirp signal, the input chirp signal including pulses, the frequency of the input chirp signal increasing or decreasing over a period of time, the circuit comprising:

digital circuitry including a counter updated by a fixed frequency clock signal, the counter being adapted to produce a count indicative of the time period between pulses of the input chirp signal, the digital circuitry further including difference circuitry connected to receive the counts of the counter to produce a difference signal indicative of the of the time period between the chirp pulses;

a difference count register for storing the difference signal indication of the time change between two different indications of the time between the chirp pulses, wherein the difference count register is accessible by the processor; and a processor electrically connected to the digital circuitry, said digital processor adapted to determine whether the frequency of the input chirp signal is increasing or decreasing over the period of time.

10. A method of demodulating an input chirp signal, the input chirp signal including pulses, the frequency of the input chirp signal increasing or decreasing over a period of time comprising the steps of:

producing a digital detect signal that gives an indication of the pulses in the chirp signal;

producing counts indicative of the time between pulses in said chirp signal, said counts producing step using the digital detect signal;

digitally filtering the digital detect signal to produce a filtered detect signal, the digital filtering including comparing the counts with a minimum and maximum count values and producing a filtered detect signal on the next chirp signal pulse as long as a count is between the minimum and maximum count values; and determining from said counts whether input chirp signal is increasing or decreasing in frequency for said period of time.

11. The method of claim 10, wherein said counts producing step includes storing the count in a shift register when the filtered detect signal is produced.

12. The demodulating circuit of claim 1, wherein the counter is incremented by a fixed frequency clock signal.

* * * * *